UNITED STATES PATENT OFFICE.

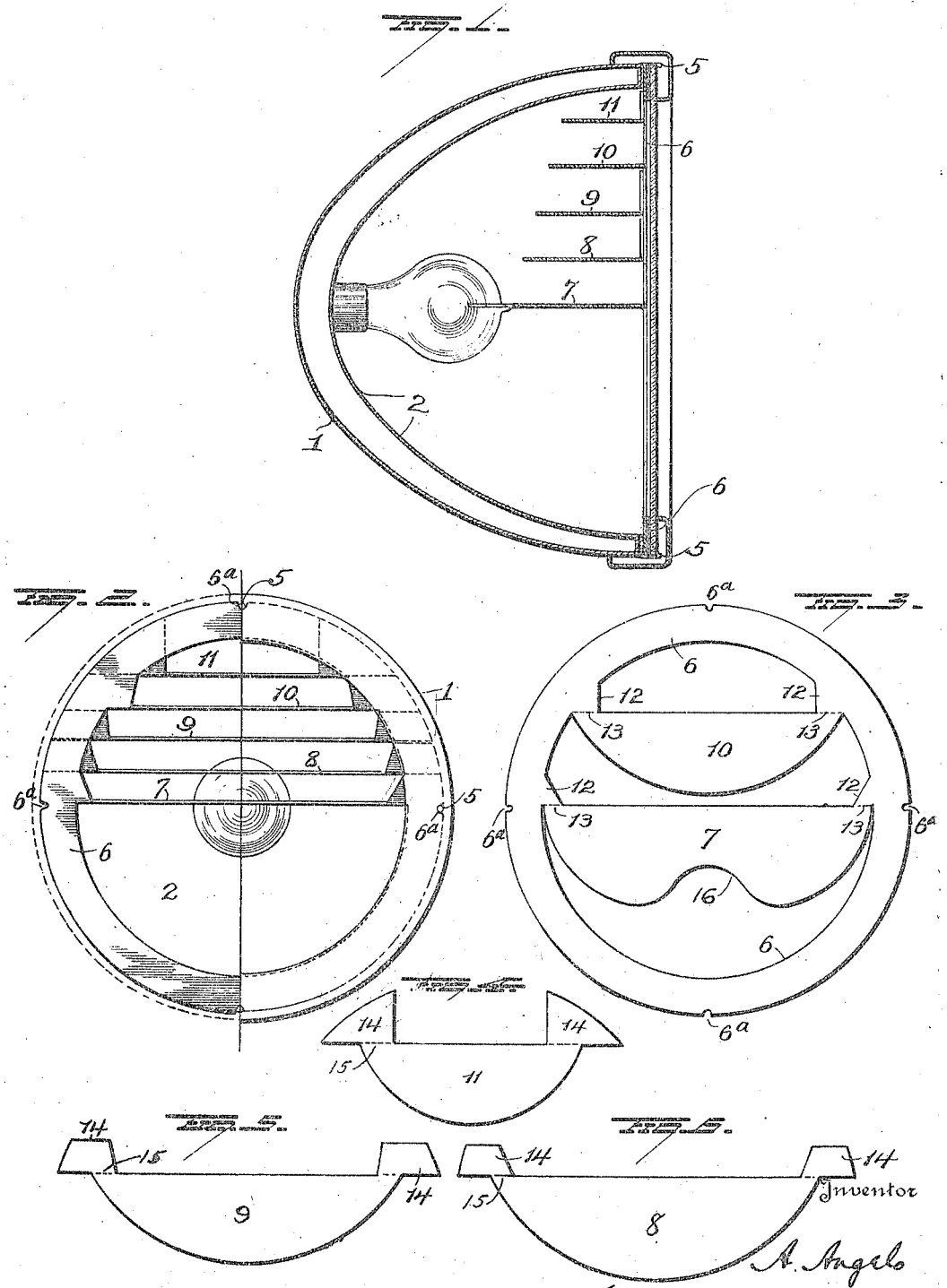

ALAN ANGELO, OF ATLANTIC CITY, NEW JERSEY.

DEFLECTING DEVICE FOR AUTOMOBILE LAMPS.

1,417,128. Specification of Letters Patent. Patented May 23, 1922.

Application filed June 17, 1920. Serial No. 389,669.

*To all whom it may concern:*

Be it known that I, ALAN ANGELO, a citizen of the United States, and a resident of Atlantic City, in the county of Atlantic and State of New Jersey, have invented certain new and useful Improvements in Deflecting Devices for Automobile Lamps; and I do hereby declare the following to be a full, clear, and exact description of the invention, such as will enable others skilled in the art to which it appertains to make and use the same.

This invention relates to improvements in deflecting devices for automobile lamps,—the object of the invention being to provide a simple and efficient structure capable of attachment to the reflector near the lens of any type of automobile lamp construction, for deflecting rays of light downwardly onto the roadway directly in front of the car and to prevent the blinding effect of the light upon the occupants of approaching cars.

With this and other objects in view, the invention consists in certain novel features of construction and combinations of parts as hereinafter set forth and pointed out in the claim.

In the accompanying drawings; Figure 1 is a sectional view of an automobile headlight structure showing an embodiment of my invention; Figure 2 is a front view; Figure 3 is a view of a blank from which a portion of the deflector structure is made, and Figures 4, 5, and 6 are face views showing three separately-attached deflector members.

1 represents a lamp casing in which the reflector 2 is located,—a lamp being disposed centrally within this structure and a glass plate being placed at the open end of the casing 1 and reflector 2,—all of which may be of any preferred construction well known in the art.

My improvement deflector structure is disposed behind the glass plate and its rim or frame portion is held between the glass plate and the forward end of the lamp casing by means of the clips 5 which hold the glass plate in place.

The deflector structure may be made of sheet metal and comprises a ring or frame 6 and a plurality of deflecting members carried thereby and projecting inwardly therefrom at right angles thereto or nearly so,—five such deflecting members 7, 8, 9, 10 and 11, being shown.

In Figure 3 of the drawing, a blank is shown cut from a single piece of metal in a manner to form the ring or frame member 6 and deflecting members 7 and 10 connected with said ring or frame member by integral lugs 12,—said deflector members being bendable at their junctures with said lugs as indicated by the dotted lines 13, so that they may be bent in a manner to cause them to project inwardly at or substantially at right angles to the ring or frame member 6. The deflector members 8, 9 and 11 may be made of separate pieces of metal and are provided at their respective ends with lugs 14 which are bendable on the lines 15 so that they may be secured by riveting or soldering to the ring or frame member 6 in a manner to permit said deflector members to project inwardly at or substantially at right angles to said ring or frame member. The ring or frame member may be provided with notches 6ª to receive projections on the lamp fixture to prevent the deflector structure from turning.

The several deflector members are made with curved free edges and they are of such widths as to project appreciable distances within the space formed by the reflector. The deflectors are made of varying widths and lengths according to the positions which they occupy,—the upper deflecting member 11 having the smallest dimensions, both in length and width and the other deflecting members having successively increasing lengths and widths as indicated in Figures 1 and 2. The lower deflector member 7 is so located that it will be disposed slightly above a horizontal plane coincident with the center of the lamp bulb and the intermediate portion of this lower deflector member is made with a depression 16 for the accommodation of the lamp bulb so that it may partially embrace the forward portion of said bulb but without actual contact therewith.

Each of the deflector members is polished on its under face so as to present a reflecting surface, but the upper faces of deflector members may be left dull.

With my improvements many of the light rays will be deflected and made to fall upon the roadway comparatively close to the front of the car and the blinding effect of the glare, when all the reflected light rays be projected directly ahead of the car, will be prevented.

Having fully described my invention what I claim as new and desire to secure by Letters-Patent, is:—

A deflector for automobiles comprising a curved frame member having integral lugs on its inner edge, deflecting members integral with said lugs and bent into horizontal planes and separate deflecting members secured to said frame member intermediate the integral deflectors.

In testimony whereof, I have signed this specification in the presence of two subscribing witnesses.

ALAN ARTHUR

Witnesses:
 HORACE H. SHARP,
 WALTER WEEKS.